E. OLSON.
STAKE.
APPLICATION FILED JAN. 22, 1921.
1,392,206.
Patented Sept. 27, 1921.
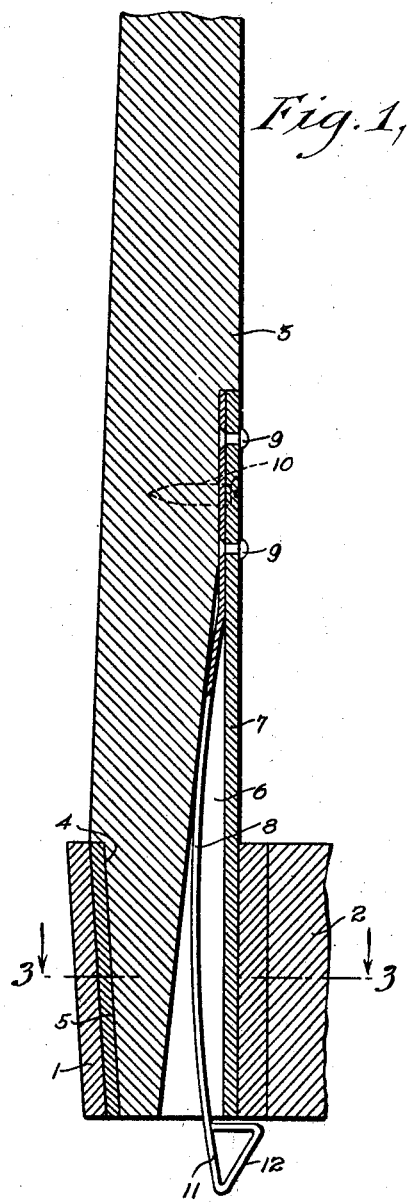
Fig. 1,
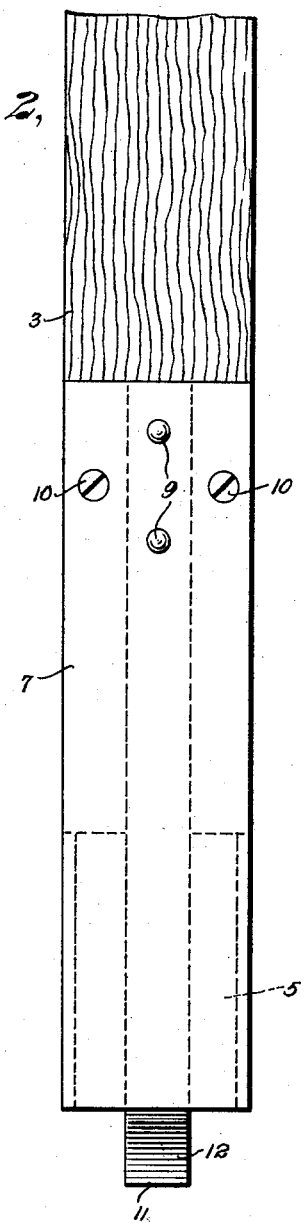
Fig. 2,
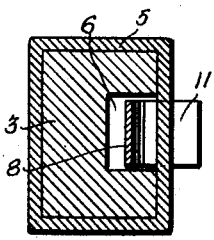
Fig. 3.
WITNESSES
Edw. Thorpe.
F. J. Foster.
INVENTOR
Erik Olson
BY Munn & Co
ATTORNEYS

UNITED STATES PATENT OFFICE.

ERIK OLSON, OF GREAT FALLS, MONTANA.

STAKE.

1,392,206.  Specification of Letters Patent. Patented Sept. 27, 1921.

Application filed January 22, 1921. Serial No. 439,145.

*To all whom it may concern:*

Be it known that I, ERIK OLSON, a citizen of the United States, and a resident of Great Falls, in the county of Cascade and State of Montana, have invented a new and Improved Stake, of which the following is a full, clear, and exact description.

This invention relates to improvements in stakes, an object of the invention being to provide a wagon body stake which carries a spring actuated locking means for automatically locking the stake in a pocket, thus obviating the very common inconvenience caused by the stake jolting out of its pocket when traveling over rough roads.

A further object is to provide a self-locking stake of this character which will be simple and practical in construction, strong and durable in use, which will efficiently perform the function for which it is intended and which will be comparatively inexpensive to manufacture.

With these and other objects in view, the invention consists in certain novel features of construction and combinations and arrangements of parts, as will be more fully hereinafter described and pointed out in the claim.

In the accompanying drawings:

Figure 1 is a view in longitudinal section illustrating my improved stake in position in a stake pocket.

Fig. 2 is a view in side elevation of the stake.

Fig. 3 is a view in transverse section through the stake on the line 3—3 of Fig. 1.

Referring in detail to the drawings, 1 represents a conventional form of tapered rectangular metal pocket extending laterally from a wagon body 2. 3 represents an ordinary wooden stake which is recessed adjacent its lower end as indicated at 4 for the accommodation of a metal ferrule 5. The ferrule 5 is shaped in accordance with the pocket 1, and its outer surface is preferably flush with the outer surface of the stake. The stake 1 is provided at one side with a longitudinally disposed tapering recess 6 deepest at the lower end of the stake.

An extension 7 of the same width as the stake and integral with one side of the ferrule, confines the upper end of a strip of bowed spring metal 8 within the upper end of the recess 6.

The upper end of the strip 8 is preferably riveted to the upper end of the ferrule extension 7 as indicated at 9, and screws 10 serve to secure the end of the extension 7 to the stake, thus maintaining the ferrule in place on the lower end of the stake.

The spring strip 8 is bent upon itself adjacent its lower end to form a substantially triangular locking dog 11. The dog 11 is slightly laterally offset from the stake and includes a cam face 12 adapted to be engaged by the edge of the pocket 1 to move the dog inwardly when the stake is inserted in the pocket.

In operation when the stake is inserted in the pocket, the dog 11 is moved inwardly by its engagement with the upper edge of the pocket as above noted. When the stake has been fully inserted, the dog 11 will be located below the pocket and will spring outwardly, locking under the lower edge of the pocket, and preventing accidental movement of the stake. It is necessary that the dog be manually operated to release the stake from the pocket.

Various slight changes and alterations might be made in the general form and arrangement of the parts described without departing from the invention, and hence I do not limit myself to the precise details set forth but consider myself at liberty to make such changes and alterations as fairly fall within the spirit and scope of the appended claim.

What I claim is:

A stake, a metal ferrule encircling the lower end of the stake, said stake having a tapering recess therein, an extension on the ferrule concealing said recess, a spring strip located in the recess and having its upper end secured to the inner face of the extension, said strip terminating in an integral locking dog located below the ferrule and engageable under the lower end of a stake pocket to prevent accidental withdrawal of a stake therefrom.

ERIK OLSON.